United States Patent
Klaghofer et al.

(10) Patent No.: US 12,118,264 B2
(45) Date of Patent: Oct. 15, 2024

(54) METHOD FOR INTELLIGENT SCREEN SHARING, SCREEN SHARING APPLICATION AND SYSTEM FOR MULTI-PARTY AND MULTI-MEDIA CONFERENCING

(71) Applicant: Unify Patente GmbH & Co. KG, Munich (DE)

(72) Inventors: Karl Klaghofer, Munich (DE); Thomas Lederer, Herrsching (DE)

(73) Assignee: UNIFY PATENTE GMBH & CO. KG, Munich (DE)

( * ) Notice: Subject to any disclaimer, the term of this patent is extended or adjusted under 35 U.S.C. 154(b) by 0 days.

(21) Appl. No.: 18/318,768

(22) Filed: May 17, 2023

(65) Prior Publication Data
US 2024/0201931 A1 Jun. 20, 2024

(30) Foreign Application Priority Data
Dec. 15, 2022 (EP) .................................. 22214018

(51) Int. Cl.
*G06F 3/14* (2006.01)
*G06F 21/62* (2013.01)

(52) U.S. Cl.
CPC .......... *G06F 3/1454* (2013.01); *G06F 21/629* (2013.01)

(58) Field of Classification Search
CPC ......... G06F 3/1454; G06F 21/629; G06F 3/14
See application file for complete search history.

(56) References Cited

U.S. PATENT DOCUMENTS

| 2006/0002315 | A1 | 1/2006 | Theurer et al. | |
| 2011/0317634 | A1* | 12/2011 | Wong | H04W 8/005 370/329 |
| 2011/0320963 | A1* | 12/2011 | Wong | H04N 21/631 715/755 |
| 2015/0160913 | A1* | 6/2015 | Lee | G09G 5/14 345/2.2 |
| 2020/0389508 | A1* | 12/2020 | Hashimoto | H04L 65/1069 |
| 2021/0048971 | A1* | 2/2021 | Tatezono | H04L 65/4015 |

FOREIGN PATENT DOCUMENTS

| CN | 107197364 A * | 9/2017 | ......... H04N 21/4363 |
| WO | WO-2022042769 A2 * | 3/2022 | ............... G06F 3/14 |

OTHER PUBLICATIONS

Extended European Search Report for European Application No. 22214018.8 dated Feb. 16, 2023.

* cited by examiner

*Primary Examiner* — Jeff Piziali
(74) *Attorney, Agent, or Firm* — Buchanan Ingersoll & Rooney PC

(57) ABSTRACT

A method for intelligent screen sharing, a screen sharing application and a system for multi-party and multi-media conferencing can be configured to allow an efficient temporary switching of screen sharing in a multi-party multi-media conference and/or automatically returning to previous presenter(s) without the need to restart the screen sharing again. In some embodiments, an automatic re-establishment of the screen sharing session can be provided as well (e.g. after a presenting user had temporarily lost network connection).

18 Claims, 5 Drawing Sheets

| Active sharing user in a screen sharing session (sequence) | SSh History | Timestamp | Paused SSh user |
|---|---|---|---|
| A | H: A | 0000 | - |
| B | H: A, B | 1000 | A |
| C | H: A, B, C | 1050 | A, B |
| A *) | H: A, B, C, A | 2000 | A, B, C *) |

Fig. 5

METHOD FOR INTELLIGENT SCREEN SHARING, SCREEN SHARING APPLICATION AND SYSTEM FOR MULTI-PARTY AND MULTI-MEDIA CONFERENCING

CROSS-REFERENCE TO RELATED APPLICATIONS

The present application claims priority to European Patent Application No. EP 22 214 018.8 filed on Dec. 15, 2022. The entirety of this application is incorporated by reference herein.

FIELD

The present invention relates to a method for intelligent screen sharing, to a screen sharing application and to a system for multi-party and multi-media conferencing. Embodiments can allow an efficient temporary switching of screen sharing in a multi-party multi-media conference and/or automatically returning to previous presenter(s) without the need to restart the screen sharing again. Further, embodiments can provide an automatic re-establishment of the screen sharing session, after a presenting user has temporarily lost network connection.

BACKGROUND

Nowadays it is quite common that a screen sharing feature is used in multi-party, multimedia real-time sessions (also known as Communication and Collaboration Conference systems). Typically, there is only one presenter and the session which is limited to one screen sharing at a time allows one presenter sharing screen content that all other participants can see during the presentation.

SUMMARY

If a temporary switch to a second (or third etc.) presenter needs to be done for sharing a screen in a communication session in screen sharing enabled communication teleconference offerings (e.g. Microsoft Teams, Zoom, Unify Office, etc.) the current presenter will typically lose (or needs to give up) the screen sharing ability to allow others to present their screen content. When the second (or third etc.) presenter has then finished, it is quite common to return to a previous presenter (e.g., to the first or second presenter) or to a moderator of the meeting. This next presenter would then need to manually (re)start the screen sharing once more with all the cumbersome implications of having to select the right screen or window again to share.

We determined that similar drawbacks occur, when a presenter of a screen sharing session temporarily loses network connection and is rejoining the ongoing session. Ideally, this presenter could continue where he/she left off before the connection got dropped.

Furthermore, in case of a multi-media session with multiple participants in which there is the need to frequently switch back and forth between, e.g. two or more presenters with screen sharing enabled, this situation becomes even more confusing and difficult to handle for the respective presenters.

Screen sharing is a well-known feature in many Communication and Collaboration tools, such as Microsoft Teams, Unify Office/Unify Video powered by RingCentral, OpenScape UC, etc.

Switching back to a previously presenting (screen sharing) user always includes manual steps of restarting screen sharing from scratch without the system preserving a previous state.

Dual screen sharing is known but is a different feature. For example, two parties (Users A and B) can both simultaneously share their screens, with all other conference participants being able to see (or to select) the contents from both sharing users (A and B). The problem here is that there is no possibility to ensure that all participants focus on the same shared screen.

In a concatenated screen sharing session (for example, first user A shares, then user B shares and then optionally user C shares) when user B (or C) stops sharing, it often happens that the initially sharing user A needs to manually restart his/her screen sharing. This manual step is error-prone and requires some time which has a negative effect on the participants meeting experience (wrong screen or wrong window may be selected, user A has to ask again "can you all see my screen?", etc.).

Also, in case the screen sharing presenter loses network connection, this presenter needs to restart screen sharing again manually. The same applies if some participant of the meeting has taken over the screen sharing by accident, e.g. by clicking on the screen sharing button and then accidentally sharing a screen.

Therefore, embodiments of the present invention can be configured to provide a method for intelligent screen sharing, a corresponding screen sharing application and a corresponding system for multi-party and multi-media conferencing to overcome the disadvantages of the state of the art.

A method for intelligent screen sharing is provided. Embodiments of the method can include steps of initiating, by a first user, a first screen sharing in a screen sharing session of a screen sharing application service to share screen content; sharing, by the first user, screen content; initiating, by a second user, a second screen sharing in the screen sharing session of the screen sharing application service to share screen content; checking, by the screen sharing application service, if multi-screen sharing is allowed and/or provided for this screen sharing session; pausing, by the screen sharing application service, the first screen sharing of the first user, in case multi-screen sharing is not allowed and/or not provided for this screen sharing session; sharing, by the second user, screen content; ending, by the second user, the second screen sharing; resuming, by the screen sharing application service, automatically back to the first screen sharing, and sharing, by the first user, screen content.

According to a preferred embodiment before the second user ends the second screen sharing, the method further comprises initiating, by a third or any further user, a third or any further screen sharing in the screen sharing session of the screen sharing application service to share screen content; checking, by the screen sharing application service, if multi-screen sharing is allowed and/or provided for this screen sharing session; pausing, by the screen sharing application service, the second screen sharing of the second user, in case multi-screen sharing is not allowed and/or not provided for this screen sharing session; sharing, by the third or any further user, screen content.

It should be appreciated that the screen sharing application service can be hosted by at least one server that has a processor connected to a non-transitory memory and at least one transceiver for communicative connections with multiple user devices via at least one network connection or other type of communication connection. The user devices can be laptop computers, personal computers, smart phones, tablets, or other types of communication terminal devices that include a processor connected to a non-transitory memory and at least one transceiver.

According to another preferred embodiment in case the third user or any further user stops the third or any further screen sharing, the method further comprises resuming, by the screen sharing application service, automatically back to the first and/or the second screen sharing according to predetermined screen sharing options, and sharing, by the first and/or second user, screen content.

According to still another preferred embodiment in case multi-screen sharing is allowed and/or provided for this screen sharing session, the method further comprises initiating, by the screen sharing application service, a multi-screen sharing of the first, second, third and/or any further user according to predetermined screen sharing options.

Further, according to a preferred embodiment in case the screen sharing is stopped due to temporary loss of network connectivity, but network connectivity is re-established, then, resuming, by the screen sharing application service, automatically back to the screen sharing which was stopped due to losing network connectivity. This approach is used in case the current presenting and screen sharing user loses his/her network connection. Due to saving of the screen sharing state information, the user's screen sharing session is being re-established again automatically upon network connection re-establishment of the user or by popping up a confirmation window to allow the user to confirm the action.

According to yet another preferred embodiment, the predetermined screen sharing options comprises resuming, by the screen sharing application service, automatically back to the first user which was the initial screen sharing user in the screen sharing session, or resuming, by the screen sharing application service, automatically back to the first, second, third or any further user which was the latest previous screen sharing user in the screen sharing session, or resuming, by the screen sharing application service, automatically back to the first, second, third or any further user which has been appointed as a moderator or as a main presenter for the screen sharing session. There are multiple ways of solving that problem so that when somebody temporarily wants to take over the screen sharing in a conferencing session, the present invention would save or halt the currently ongoing screen share to allow another participant to share and be able to return to exactly the same screen sharing of the previous participant, if he/she hasn't stopped sharing in the meantime. This can even be done in a stacked fashion so that a third user can temporarily share his/her screen and when ending, it would automatically switch back to the second user or the first user if the second user has already ended his/her screen share. There are different options how the inventive method can be employed for deciding which previous screen sharing users to be returned to automatically, after a user has ended his/her screen sharing session. For example, returning to the screen sharing of the first user, because he/she was the initial screen sharing user in the conference or returning to the screen sharing of the previous user who was the user sharing before another user who just ended his/her screen sharing.

According to yet another preferred embodiment the predetermined screen sharing options are carried out by means of a screen sharing historical data analytics application and/or a real-time voice analytics application and/or a real-time video analytics application and/or wherein these applications are supported by artificial intelligence (AI), machine learning (ML) and/or natural language processing (NLP). The method can further use statistical data (historical data) from past multi-media conferences. For example, if typically, the original user starts screen sharing again, after another user temporarily had taken over screen sharing, the fallback goes to the originating user automatically sharing his/her screen. This can also include continuous learning based on AI/ML methods.

According to yet another preferred embodiment, the predetermined screen sharing options comprises resuming automatically back to the first, second, third or any further user in case upon a detection and analysis of a key word or a key phrase by a real-time voice analytics application which suggests the resuming; and/or in case upon a detection and analysis, by a video analytics application, of a gesture and/or an enabling of video data by the first, second, third or any further user which suggests the resuming. Further, the method can use input data from other communication channels, such as a voice communication channel and detects keywords or key phrases using NLP of the user voices in real-time. If a user, who is just dropping his/her screen share session speaks, for example, "I now hand over back to user X", this is used by the method to automatically switch back to the screen sharing of user X (X stands for any user). Further, the method can analyze a video communication channel and detects a changed/new active speaker and thus automatically switched back screen sharing to the changed/new user.

According to yet another preferred embodiment, the method further comprises requesting, by the screen sharing application service, from a user a confirmation to screen sharing and/or a confirmation if a user wants to restart exactly the same screen sharing as was shared before by this user. As another implementation option, the method may request a previous presenting user, whether he/she wants to continue screen sharing, followed by a user's confirmation or rejection of this request.

A screen sharing application is also provided. The screen sharing application can be a server or other type of communication device having a processor connected to a non-transitory computer readable medium and at least one transceiver. the screen sharing application can be configured to perform an embodiment of the method for intelligent screen sharing according to any of the above-mentioned embodiments. From an implementation perspective, the application can be configured to save information (e.g. state information) either within the screen sharing application service itself, or within a separate service (layer) of the inventive system that interacts with the screen sharing application and the system. To simplify the description, the term screen sharing application service is also named screen sharing application, however, this application or service can be stand-alone device having a processor connected to non-transitory memory and at least one transceiver that is connected to a server via suitable interfaces or it can be part of a server that hosts the service. Screen sharing often is implemented in a similar fashion as a video communication, e.g., the "moving pictures" of the shared screen are being transmitted to the screen sharing application (and further to the peer users) in form of a video stream. It should be noted that also image oriented screen sharing techniques are known, in which only changed pixels are being transmitted. In the example of a video technology being used, it is necessary that suitable video stream channels be established between an endpoint (e.g. user devices) and the system's screen sharing application service upon start of screen sharing and kept open in a kind of "paused" state even while another user had taken over screen sharing. The maintained (but paused) transport channels can then easily be re-used upon screen sharing switch back to any of the users. Besides the transport channel re-use, also the contents shared is being saved, so that in case of a switch back, the correct screen and/or correct application window can be continued being shared. Typically, the screen sharing application has a server part (e.g. the part of the service hosted by the server providing the service) and a client part (e.g. the part of the application run at the user device that is using the service hosted by the server). Synchronization of screen sharing state information between server part and screen sharing clients can be provided in embodiments of the method and apparatus.

According to a preferred embodiment, the screen sharing application service comprises a screen sharing session control unit; a screen sharing application configuration unit; at least one interface to an analytics application; and/or at least one interface to a media-, meeting-, and/or conference server platform. These elements can all be components of a single computer device or can be components of separate computer devices that are connected to each other. Each such computer device can include a processor connected to non-transitory memory and at least one transceiver.

According to another preferred embodiment, the at least one interface to an analytics application comprises a screen sharing historical data analytics application to save and to analyze historical screen sharing data; and/or a real-time voice analytics application to analyze real-time voice data of a screen sharing session; and/or a real-time video analytics application to analyze real-time video data of a screen sharing session.

According to still another preferred embodiment, the screen sharing session control unit further comprises a user notification unit to notify and/or to request the users to confirm, if they want to share their screen and/or a screen sharing session state unit to keep track of screen sharing session history.

A system for multi-party and multi-media conferencing is also provided. The system can include screen sharing application service for intelligent screen sharing according to any of the above-mentioned embodiments. Embodiments of the system can be a communication system, a screen sharing enabled communication conferencing apparatus, a screen sharing hosting apparatus, or other type of communication apparatus.

According to a preferred embodiment, the system further comprises one or more clients or endpoints, each having a hardware, an operating system and a screen sharing client;

a voice application; a video application; and/or a meeting-, conference-, and/or media server platform having a hardware and an operation system.

According to yet another aspect of the present invention, a program element is provided, which when being executed by a processor is adapted to carry out steps of the method for intelligent screen sharing. The program element can be stored in a non-transitory computer readable medium that is accessible to a processor of a device so that the processor can run code of the program element, for example.

According to another aspect of the present invention, a non-transitory computer-readable medium comprising program code is provided, which when being executed by a processor is adapted to carry out steps of the method for intelligent screen sharing.

A non-transitory computer-readable medium may be a floppy disk, a hard disk, an USB (Universal Serial Bus) storage device, a RAM (Random Access Memory), a ROM (read only memory) or an EPROM (Erasable Programmable Read Only Memory). A computer-readable medium may also be a data communication network, e.g. the Internet, which may allow downloading a program code.

It has also to be noted that aspects of the invention have been described with reference to different subject-matters. In particular, some aspects or embodiments have been described with reference to apparatus or system type claims whereas other aspects have been described with reference to method type claims. However, a person skilled in the art will gather from the above and the following description that, unless otherwise notified, in addition to any combination between features and embodiments belonging to one type of subject-matter also any combination between features relating to different types of subject-matters are considered to be disclosed with this text. In particular, combinations between features or embodiments relating to the apparatus or system type claims and features relating to the method type claims are considered to be disclosed.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawing(s).

FIG. 5 shows a table of screen sharing session states according to another embodiment of the invention.

Figure 1:
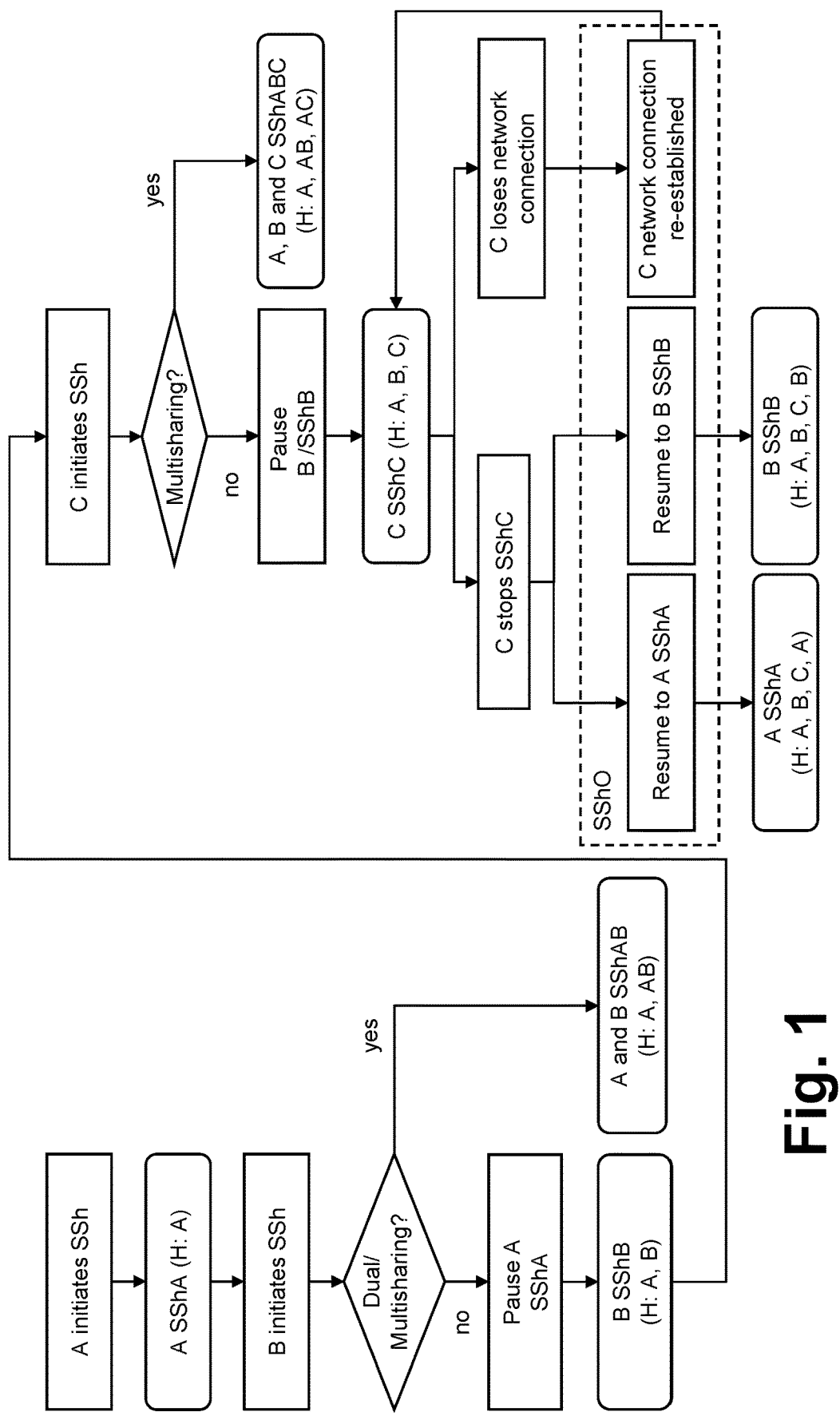
FIG. 1 shows a chart of process steps of the method according to an embodiment of the invention.

Reference numerals used in the drawings include:
SSh screen sharing
SSA screen sharing application service
SSS screen sharing session
SShO screen sharing options
H history of screen sharing
A first user A
B second user B
C third user C
N any further user N
SShA screen sharing of first user A
SShB screen sharing of second user B
SShC screen sharing of third user C
SShN screen sharing of any further user N
SShAB dual sharing of first user A and second user B
SShABC multisharing of users A, B and C
EP A endpoint device of first user A
EP B endpoint device of second user B
EP C endpoint device of third user C
EP N endpoint device of any further user N
OS operating system
HW hardware
RT voice analytics real-time voice analytics
RT video analytics real-time voice analytics

DETAILED DESCRIPTION

FIG. 1 shows in a chart illustrating the process steps of an embodiment of method of intelligent screen sharing. In this particular illustrated exemplary embodiment, it is assumed that an audio/video conference session with several participants has already been started between different users (e.g. a first User A and at least one second user B) via their user devices (e.g. communication terminals such as laptop computers, personal computers, smart phones, tablets etc.) and a communication connection those user devices have to a server hosting a conferencing service via at least one communication connection (e.g. at least one network connection, an internet connection, etc. the user devices have with the server, which is a computer device that includes a processor connected to non-transitory memory and at least one transceiver). This conference session is further designed to allow and enable screen sharing. A first participant (first user A) initializes a first screen sharing (SShA) and shares the content of a screen. In the course of the conference another participant (second user B) initializes a second screen sharing (SShB). Then, a screen sharing application responsible for monitoring and controlling the screen sharing during the conference session (e.g. an application of the server hosting the service) checks whether dual screen sharing or multisharing of screens is possible and/or allowed for this session.

If dual/multisharing is allowed and possible, the screen sharing application SSA arranges for both participants (user A and user B) to share their screens simultaneously (SShAB).

If, however, multisharing is not possible or not permitted, the SSA puts the screen sharing (SShA) of user A into a "pause" or hold mode. This does not mean, however, that the screen sharing of user A is terminated as is usually the case in the state of the art, but that all connections, e.g., Internet protocol ports (IP ports) of user A remain open or are maintained and are merely put on hold. Also, the last display of the screen sharing of user A is saved so that it can be accessed again at a later time.

Afterwards, user B can now share his screen and its content. Another participant user C now initiates another screen sharing. Again, it is asked whether multisharing is possible and wanted, and if so, several users A, B, and C can share their screens. However, if multisharing is not possible or not permitted, the SSA puts the screen sharing of user B, whose turn it was to share the screen, into pause/on hold mode and user C can now share his/her screen content.

During the entire course of a screen sharing session, the SSA tracks or saves the state of the screen sharing session, e.g., the SSA knows at any time during the screen sharing session (SSS) which user is currently sharing his screen and which user had shared his screen before and is now in pause mode. Furthermore, the SSA also knows whether the network connection to one of the users was interrupted and when it could be re-established. The SSA therefore stores all states in the form of a log or a history (H) so that it can be traced exactly who is sharing their screen and when, and which users are still in pause mode, as well as the exact chronological sequence of the states.

In case user C loses the network connection to the screen sharing conference application, but this network connection could be re-established a short time later, the SSA can automatically bring the user back into the conference and/or return to the screen sharing of user C without the user having to dial in and then share his screen again. In the SSA, it is possible to also define how long the system should wait for an unconnected user if the user loses his network connection. For the case that user C does not re-establish the network connectivity or for the case that user C wants to end the screen sharing intentionally, different predefined screen sharing options (SShO) can be configured in the SSA. For example, in such cases it is possible to return to the screen sharing of the user who was the last in the history kept by SSA to share his screen before user C, in this case this would be user B. However, it is also possible to return to the screen sharing of the first user A, who was the first or initial one in the recorded history of SSA. Furthermore, it is also possible to return to the screen sharing of a predefined moderator or main presenter.

Furthermore, before the end of a screen sharing and/or before the continuation of an own screen sharing, a message or notification can be sent to the respective user by the SSA, whereby this user can then decide for himself/herself whether he/she wants to share his/her screen again or not. The other users can also be informed by the SSA about their status and/or the status of the other users regarding the screen sharing by means of messages and/or permanent or temporary on-screen messages.

Figure 2:
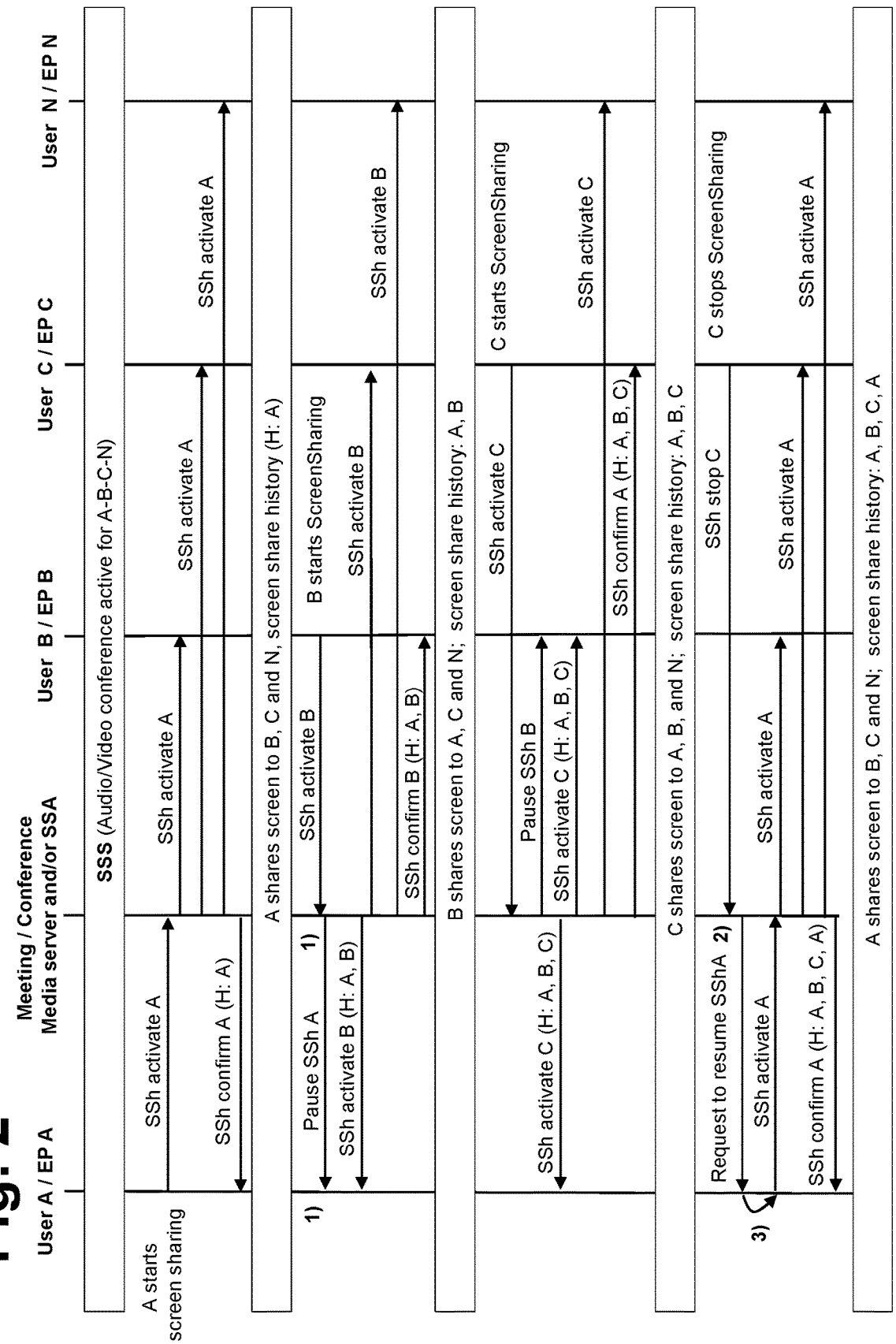
FIG. 2 shows a flowchart of a call flow for intelligent screen sharing according to another embodiment of the invention.

FIG. 2 shows a call flow chart of a system in which an audio or video conference with active participants/users A, B, C and N hosted by a meeting or conference server can be seen. In the sense of the invention, N is any further user and can be any positive natural number. The system further comprises a screen sharing application SSA that may be part of the conference server. In any case, the SSA is configured to have, at any time during the conference session, information about the network connectivity of the active participants as well as the status regarding the screen sharing of each active participant of the conference. User A starts screen sharing via his/her endpoint device (EP A). The meeting or conference server or the SSA as well as the other user endpoint devices B, C and N are then informed about this with SSh activate messages. The Message SSh activate in this example for a call flow diagram represents an abstraction of a message exchange in order to initiate the necessary Internet Protocol (IP) ports, User Datagram Protocol (UDP) ports and/or Transmission Control Protocol (TCP) ports for the transport channels of the screen sharing session. Depending on used protocol stacks this may be, for example, Session Initiation Protocol (SIP) Session Description Protocol (SDP) Offer/Answer exchanges, H.323 OpenLogicalChannels message exchanges, and/or Web Real-Time Communication (WebRTC) PeerConnection Application Programming Interface (API) procedure. Then, the screen sharing of user A is confirmed by the SSA. Furthermore, a history log records that user A has taken over the screen sharing at time x. This can be done with an entry such as "user A has taken over the screen sharing at time x". This can be marked with an entry like "H: A" (see also FIG. 5 for screen sharing history). Afterwards, user A shares his screen content with the other users B, C and N. At some point during the conference, user B starts the screen sharing. After the SSA is informed about it, screen sharing of user A SShA is then put into pause or on hold mode (see 1) in FIG. 2). Instead of dropping the SSh connection of user A, user A's screen sharing connection is just paused. IP ports are being kept open and the shared screen/window information or content is stored in the endpoint device of user A (EP A). As an implementation option a "Pause of SShA" message may also be sent to the passive end points of user C and N to also maintain IP ports for this connection. The SSA now informs the endpoints of users A, C and N that B is taking over the screen sharing and the corresponding IP ports are activated. The SSA confirms B's screen sharing and creates another entry, for example, in the form H: A, B in the log history with the corresponding time stamp. User B then shares the contents of his screen with the users A, C and N. Now user C wants to share his/her screen. After the SSA has received this information from endpoint C, the screen sharing of user B is put into pause mode. Again, all associated IP ports remain open. The endpoints of user A, B and N are informed about the screen sharing of user C and the corresponding channels and IP ports are activated. The SSA confirms user C's screen sharing, and another log history entry is generated (H: A, B, C). Then user C shares the contents of his screen with the users A, B and N. After that, however, user C stops the screen sharing. The SSA is informed about this and initiates a fallback scenario. In this case, SSA determines the screen sharing to fall back to the original sharing user A (see. 2) of FIG. 2). Which scenario is applied in which particular case may be predetermined in the SSA by screen sharing options. E.g. the screen sharing could have gone back to user B, because according to the screen sharing history, user B had shared his screen directly before user C. Then, automatic re-initiation of the previous screen sharing of user A is performed, without any manual action required by user A. Neither a manual start of the screen sharing application, nor a manual selection of the appropriate window/screen to share is necessary. As an implementation option, user A may be notified whether he/she wants to continue sharing (not shown). The further SSh activate message procedure is used to ensure that IP ports are active as needed at all endpoints and SSA. If previously the SSA had also sent Pause messages to the passive endpoints, the transport connections that are still existing may just be re-used, but typically would need a sync message for resumption. The SSA confirms the screen sharing of user A and records in the history log the entry H: A, B, C, A. Subsequently, user A shares his screen content again with the users B, C and N. In a typical implementation of such a system, the conference server, the meeting server and/or the SSA forward switches the screenshare contents to the peer users. Besides centralized media exchange architectures, also de-centralized media distribution may be possible in such a system.

Figure 3:
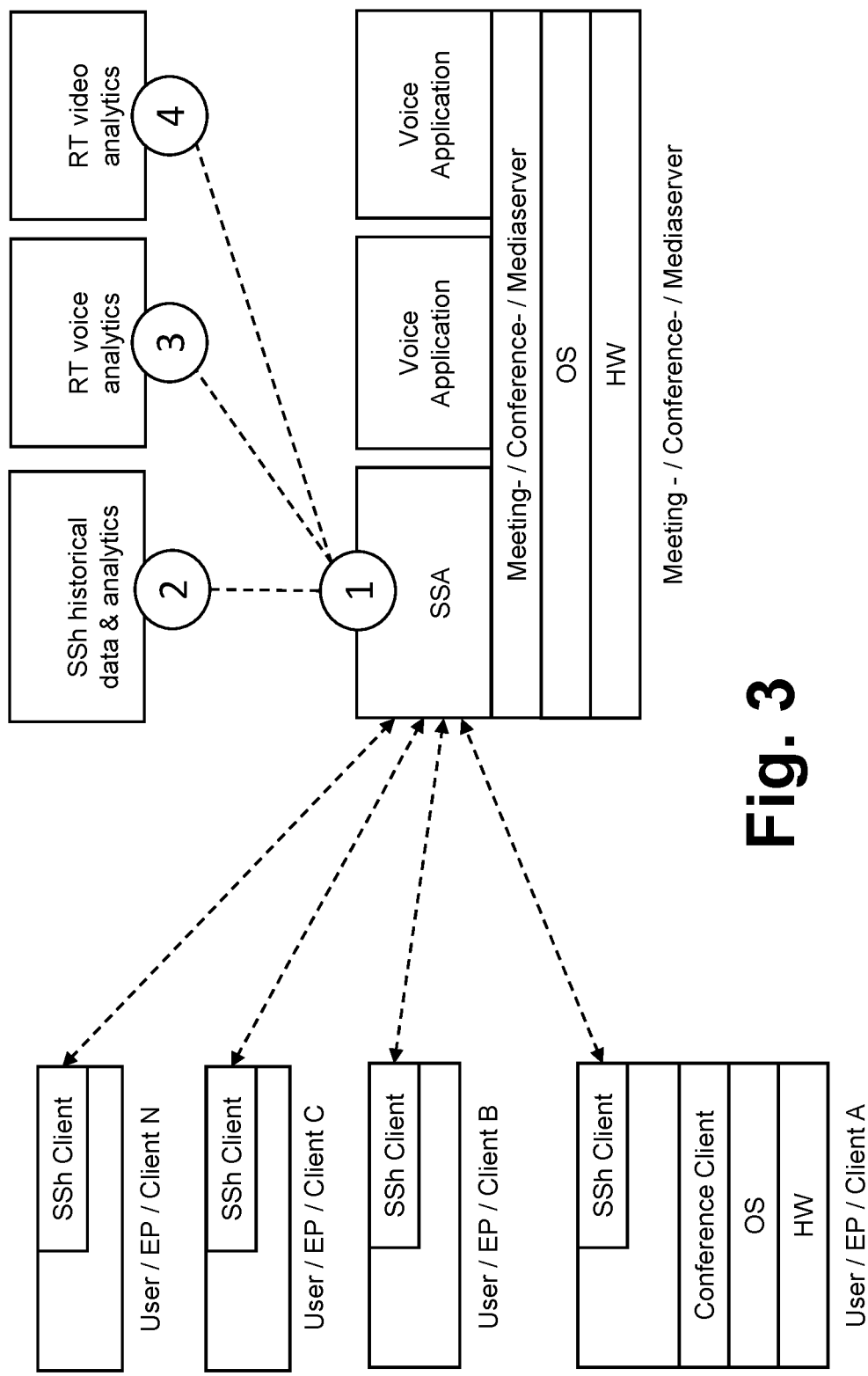
FIG. 3 shows a schematical illustration of a high-level system architecture example according to another embodiment of the invention.

In FIG. 3, a schematic illustration of a high-level system architecture example is shown. In order to better describe the interaction of the individual components in FIG. 3, the call flow example shown in FIG. 2 is used as a basis. The endpoint devices of users A, B, C and N are also referred to as clients which include a screen sharing client SSh client. In addition, the endpoints may encompass their own hardware (HW), a suitable operation system (OS), and a conference client. The endpoints, or user devices, can also include other elements such as input devices (camera sensor, camera, keyboard, pointer device, touch screen, microphone, etc.) and output devices (e.g. screen, speaker, etc.). These user clients A to D are connected to the SSA which can be part of a meeting-, conference-, and/or media server platform. However, the SSA can also be operated as a stand-alone component and only needs to be connected to such a server platform via suitable interfaces. A media-, meeting-, and/or conference server typically includes a server-side component to communicate with the respective clients. Further, the server includes a hardware (HW) component and an operating system (OS). The hardware component can include a processor connected to a non-transitory memory and at least one transceiver. The server may also include audio and video components or applications by itself or by being connected with suitable interfaces. These are mainly intended to control the audio, and video traffic and their settings between server and clients. As can be seen in FIG. 2, various screen sharing options can be used or defined as configuration rules in the SSA that offer a possible fallback option when a screen sharing of one of the users is terminated in order to switch the screen sharing to another user. However, according to the invention, there can be further possibilities how a fallback can take place in case of termination of a screen sharing of one of the participants. Possible influencing factors for determining to which previous presenting user to switch back screen sharing upon user C stops screen sharing (if previously users A, then B, then C were sharing):

Fallback to user A or to user B, based on configured rules in the SSA.

Figure 4:
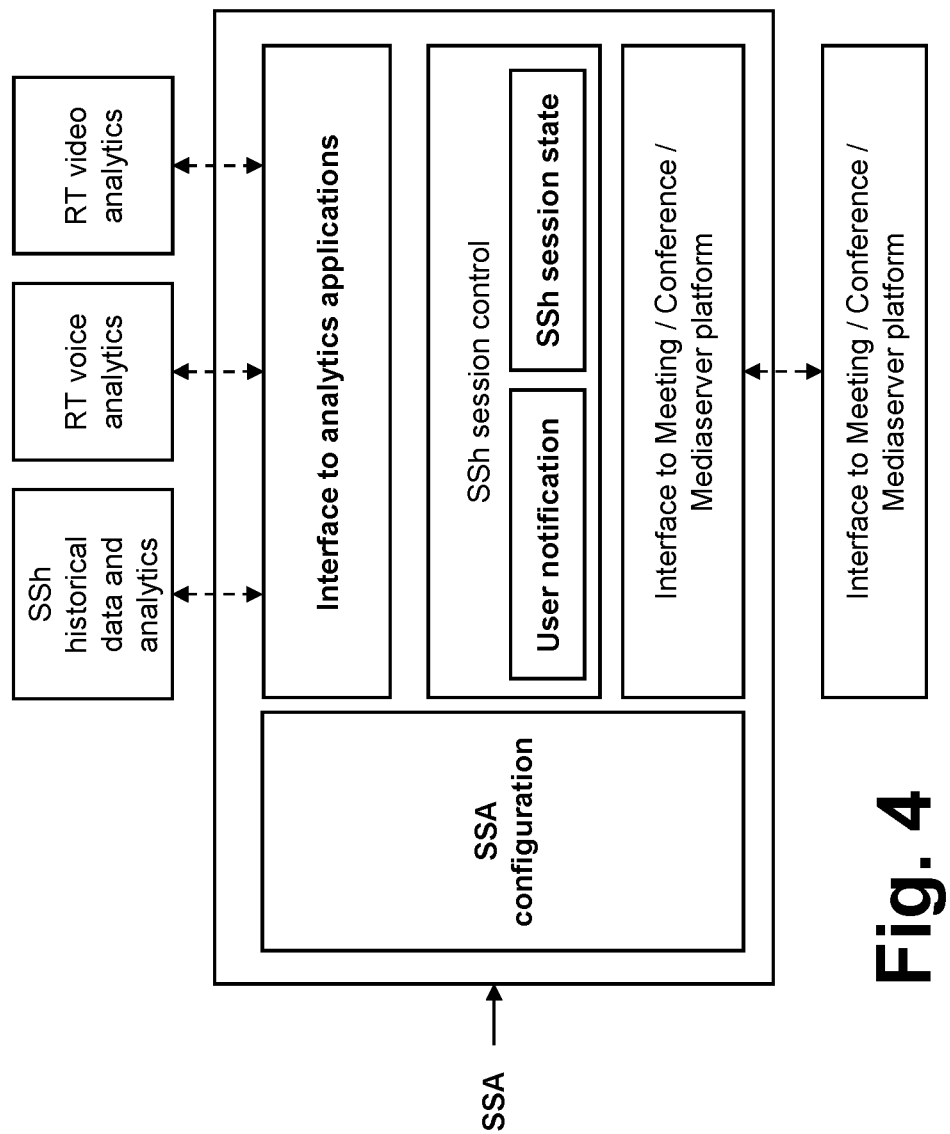
FIG. 4 shows a schematical illustration of a screen sharing application, SSA, according to another embodiment of the invention.

Fallback to user A or B, depending on which user in the past was continuing sharing, in such a situation historical data is taken, e.g. from a SSh analytics repository or a SSh historical data analytics (see FIG. 4 for details). The system uses statistical data from past multi-media conferences. For example, if typically, the original user starts screen sharing again, after another user temporarily had taken over screen sharing, the fallback goes to the originating user A with automatically sharing his/her screen. This can also include continuous learning based on AI or ML methods (see FIG. 4 SSh historical data and analytics). It is also possible that with such method users are identified who usually lead a session, e.g. as moderator or as main presenter. In such a case it is possible to switch directly back to such a moderator or main presenter.

Fallback to user A or B, based on real-time (RT) voice analytics. For example, if a real-time voice analytics captures the phrase "i will now continue sharing", or similar phrasing of user A, then automatically screen sharing is passed to user A. The system or the SSA takes input data from other communication channels, such as a voice communication channel and detect keywords or does NLP of the voice. For another example, if user C, who is just dropping his/her screen sharing session speaks "I now hand over back to user A" or a similar phrase, this is used by the system to automatically switch back to the screen sharing of user A (see FIG. 4 RT voice analytics). This can also include continuous learning based on AI or ML methods.

Fallback to user A or B based on real-time (RT) video analytics of user A and B. For example, if one of user A or B is just turning on his/her video or the RT video analytics detects a changed or new active speaker (user A) and thus automatically switched back screen sharing to user A. This can also include continuous learning based on AI or ML methods.

As another implementation fallback option, the system or the SSA asks a previous presenting user (B or A), whether he/she wants to continue screen sharing, followed by a user's confirmation or rejection (see FIG. 4 user notification unit).

Or combinations of any of the above solutions.

FIG. 4 shows a schematical illustration of a screen sharing application, SSA. From an implementation perspective information saving (state information) can be utilized either within the screen sharing application service itself, or within a separate service (layer) of the communication system that interacts with the screen sharing application and the communication system. The term screen sharing application (SSA) can refer to such services but is not limited to this term. Screen sharing often is implemented in a similar fashion as a video communication, e.g. the "moving pictures" of the shared screen are being transmitted to the screen sharing application SSA (and further to the peer users) in form of a video stream. But also image oriented screen sharing techniques are known, in which only changed pixels are being transmitted. In the example of a video technology being used, suitable video stream channels can be established between an endpoint of user A and the communication system's screen sharing application SSA upon start of the screen sharing and kept open in a kind of "paused" state even while another user B or C had taken over screen sharing. The maintained (but paused) transport channels can then easily be re-used upon screen sharing switch back to user A (See FIG. 2 for an example Call Flow between central screen sharing application (SSA) and the involved screen sharing Endpoints). Besides the transport channel re-use, also the contents shared are being saved, so that in case of a switch back, the correct screen and/or correct application window can be continued being shared. Typically, the screen sharing application has a server part and a client part. Synchronization of screen sharing state information between server part and screen sharing clients is part of the solution.

The SSA as shown in FIG. 4 comprises an SSh session control. This SSh session control handles the regular operation of a SSh session. This includes, e.g. the monitoring of the SSh session state and the user notification. The SSh session state monitoring keeps track of the screenshare session history in terms of all the shared and paused users (see also FIG. 5). The user notification, if configured in SSA configuration, implements the notification to the suggested user to whom the switch back is being proposed, asking him/her for confirmation or informing the users about the SSh session state. Further, according to FIG. 4, the SSA comprises a SSA configuration unit. By means of this unit, various parameters for the SSh can be configured, such as:

- Intelligent SSh which can be switched "On" or "Off".
- Notifications which can also turned "On" or "Off", for example, if Intelligent SSh is in an "On" state then a notification is send to the selected next user asking for confirmation whether he/she wants to continue sharing.
- Whether the paused user's sharing data (e.g. shared screen, shared window) shall be captured locally by the client or at the server side.

Further, the SSA may comprise an interface to analytics applications such as real-time (RT) voice analytics applications, real-time (RT) video analytics applications or SSh historical data analytics applications. These analytics applications help in determining to which previous presenting/sharing user to switch back to (see FIG. 3. for the details). Finally, the SSA comprises interfaces to a meeting-, conference-, or media server platform. These interfaces are regular interfaces and APIs connect the platform system with the SSA.

In FIG. 5 a table of screen sharing session states is depicted. As shown in the example table, the current active sharing users in a screen sharing session are noted. For this purpose, a chronological sequence in the form of a screen sharing history is logged, indicating from which user to which user the screen sharing was passed. Furthermore, a timestamp is stored. This allows to track exactly when which users have shared their screens. The users currently in pause mode are also listed.

In the table of FIG. 5, the reference "*)" indicates an implementation option in which, upon screensharing fallback to the original user A (after user C stopped sharing), all previous Paused states may either be deleted (not shown) or Preserved (shown in the example table).

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

It should be appreciated that different embodiments of the method for intelligent screen sharing, communication system for intelligent screen sharing, communication apparatus for intelligent screen sharing, and non-transitory computer readable medium can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus for intelligent screen sharing, telecommunication device for intelligent screen sharing, computer device for intelligent screen sharing, a network, a server that hosts intelligent screen sharing services, a communication system, and methods of making and using the same have been shown and described above, it is to be distinctly understood that the invention is not limited thereto but may be otherwise variously embodied and practiced within the scope of the following claims.

What is claimed is:

1. A method for intelligent screen sharing, the method comprising:

initiating a first screen sharing in a screen sharing session of a screen sharing application service to share a screen content of a first user device of a first user;

sharing the screen content of the first user device in the first screen sharing during the screen sharing session such that the screen content of the first user device is shared during the screen sharing session with at least one other user device of the screen sharing session to display the screen content of the first user device via the at least one other user device of the screen sharing session, the at least one other user device including a second user device;

initiating a second screen sharing in the screen sharing session of the screen sharing application service to share a screen content of the second user device of a second user during the screen sharing session;

checking, by the screen sharing application service, whether multi-screen sharing is allowed and/or provided for the screen sharing session;

pausing, by the screen sharing application service, the first screen sharing of the first user upon a determination that multi-screen sharing is not allowed and/or not provided for the screen sharing session;

sharing the screen content of the second user device in the second screen sharing during the screen sharing session such that the screen content of the second user device is shared during the screen sharing session with at least the first user device to display the screen content of the second user device via the first user device;

ending the second screen sharing during the screen sharing session;

automatically resuming, by the screen sharing application service, the first screen sharing of the share screen content of the first user device during the screen sharing session; and sharing, by the first user device, the screen content of the first user device after the first screen sharing is resumed.

2. The method of claim 1, wherein the at least one other user device of the screen sharing session includes a third user device, the method further comprises:
   initiating a third screen sharing in the screen sharing session of the screen sharing application service to share a screen content of the third user device of a third user before the second screen sharing ends;
   checking, by the screen sharing application service whether multi-screen sharing is allowed and/or provided for the screen sharing session;
   pausing, by the screen sharing application service, the second screen sharing when multi-screen sharing is not allowed and/or not provided for the screen sharing session; and
   sharing, the screen content of the third user device in the third screen sharing during the screen sharing session such that the screen content of the third user device is shared during the screen sharing session with at least the first user device and the second user device to display the screen content of the third user device via the first user device and the second user device.

3. The method of claim 2, comprising:
   in response to the third screen sharing stopping, automatically resuming, the first screen sharing and/or the second screen sharing according to one or more pre-defined screen sharing options.

4. The method of claim 3, comprising:
   after the automatic resumption of the second screen sharing, sharing the screen content of the second user device of the second user during the screen sharing session.

5. The method of claim 1, comprising:
   in response to determining that multi-screen sharing is allowed and/or provided for the screen sharing session, initiating a multi-screen sharing of the first user device and the second user device according to one or more pre-defined screen sharing options.

6. The method of claim 1, comprising:
   in response to the first screen sharing or the second screen sharing stopping due to a loss of network connectivity in which network connectivity is subsequently re-established after the loss of network connectivity during the screen sharing session, resuming, by the screen sharing application service, automatically back to the first screen sharing or second screen sharing which was stopped due to the loss of the network connectivity.

7. The method of claim 3, wherein the one or more pre-defined screen sharing options comprises:
   resuming, by the screen sharing application service, automatically back to the first user device which was an initial screen sharing user in the screen sharing session; or
   resuming, by the screen sharing application service, automatically back to the first, second, third or any further user which was a latest previous screen sharing user in the screen sharing session; or
   resuming, by the screen sharing application service, automatically back to the first, second, third or any further user appointed as a moderator of the screen sharing session or appointed as a main presenter for the screen sharing session.

8. The method of claim 3, wherein the one or more pre-defined screen sharing options are carried out by means of a screen sharing historical data analytics application and/or a real-time, voice analytics application and/or a real-time video analytics application that are supported by artificial intelligence, machine learning and/or natural language processing.

9. The method of claim 3, wherein the one or more pre-defined screen sharing options comprises:
   resuming automatically back to screen sharing of the first, second, third or any further user device upon a detection and analysis of a key word or a key phrase by a real time voice analytics application and/or upon a detection and analysis by a video analytics application of a gesture and/or an enabling of video data by the first, second, third or any further user device.

10. The method of claim 1, comprising:
    requesting, by the screen sharing application service, a confirmation to screen sharing.

11. A screen sharing service apparatus, comprising:
    a computer device having a processor connected to a non-transitory memory and at least one transceiver, the computer device communicatively connectable with a first user device of a first user and a second user device of a second user, the computer device configured to:
    initiate a first screen sharing in a screen sharing session to share a screen content of the first user device of the first user;
    share the screen content of the first user device during the screen sharing session such that the screen content of the first user device is shared during the screen sharing session with at least one other user device of the screen sharing session to display the screen content of the first user device via the at least one other user device of the screen sharing session, the at least one other user device including the second user device;
    initiate a second screen sharing in the screen sharing session to share a screen content of the second user device of the second user;
    check whether multi-screen sharing is allowed and/or provided for the screen sharing session;
    pause the first screen sharing of the first user device upon a determination that multi-screen sharing is not allowed and/or not provided for the screen sharing session;
    share the screen content of the second user device during the second screen sharing during the screen sharing session such that the screen content of the second user device is shared during the screen sharing session with at least the first user device to display the screen content of the second user device via the first user device;
    end the second screen sharing;
    automatically resume the first screen sharing of the share screen content of the first user device; and
    share the screen content of the first user device after the first screen sharing is resumed.

12. The apparatus of claim 11, wherein the apparatus comprises:
    a screen sharing session control unit;
    a screen sharing application configuration unit;
    at least one interface to an analytics application; and/or
    at least one interface to a media-, meeting-, and/or conference server platform.

13. The apparatus of claim 12, wherein the at least one interface to an analytics application comprises:
    a screen sharing historical data analytics application to save and analyze historical screen sharing data; and/or
    a real-time voice analytics application to analyze real time voice data of the screen sharing session; and/or
    a real-time video analytics application to analyze real time video data of the screen sharing session.

14. The apparatus of claim 12, wherein the screen sharing session control unit further comprises a user notification unit to issue notifications to confirm sharing of screen content and/or a screen sharing session state unit to keep track of screen sharing session history.

15. A system for multi-party and multi-media conferencing, comprising:
a screen sharing service apparatus including:
- a computer device having a processor connected to a non-transitory computer readable medium and at least one transceiver, the computer device communicatively connectable with a first user device of a first user and a second user device of a second user, the computer device configured to:
- initiate a first screen sharing in a screen sharing session to share a screen content of the first user device of the first user;
- share the screen content of the first user device in the first screen sharing during the screen sharing session such that the screen content of the first user device is shared during the screen sharing session with at least one other user device of the screen sharing session to display the screen content of the first user device via the at least one other user device of the screen sharing session, the at least one other user device including the second user device;
- initiate a second screen sharing in the screen sharing session to share a screen content of the second user device of the second user;
- check whether multi-screen sharing is allowed and/or provided for the screen sharing session;
- pause the first screen sharing of the first user device upon a determination that multi-screen sharing is not allowed and/or not provided for the screen sharing session;
- share the screen content of the second user device during the second screen sharing during the screen sharing session such that the screen content of the second user device is shared during the screen sharing session with at least the first user device to display the screen content of the second user device via the first user device;
- end the second screen sharing;
- automatically resume the first screen sharing of the share the screen content of the first user device; and
- share the screen content of the first user device after the first screen sharing is resumed.

16. The system of claim 15, wherein the system further comprises:
the first user device and the second user device communicatively connected to the computer device.

17. The system of claim 15, wherein the computer device is a meeting-, conference-, and/or media server platform.

18. The system of claim 15, wherein the computer device includes a real-time voice application and/or a real time video application.

* * * * *